(12) United States Patent  
Han et al.

(10) Patent No.: US 8,917,247 B2  
(45) Date of Patent: *Dec. 23, 2014

(54) EXTERNAL DEVICE IDENTIFICATION METHOD AND APPARATUS IN A DEVICE INCLUDING A TOUCH SPOT, AND COMPUTER-READABLE RECORDING MEDIUMS HAVING RECORDED THEREON PROGRAMS FOR EXECUTING THE EXTERNAL DEVICE IDENTIFICATION METHOD IN A DEVICE INCLUDING A TOUCH SPOT

(75) Inventors: Kuk-hyun Han, Suwon-si (KR); Pil-seung Yang, Suwon-si (KR); Hark-joon Kim, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 824 days.

This patent is subject to a terminal disclaimer.

(21) Appl. No.: 12/838,173

(22) Filed: Jul. 16, 2010

(65) Prior Publication Data

US 2010/0277435 A1 Nov. 4, 2010

Related U.S. Application Data

(63) Continuation-in-part of application No. 12/133,812, filed on Jun. 5, 2008, now abandoned, and a continuation-in-part of application No. 12/274,755, filed on Nov. 20, 2008, now Pat. No. 8,773,361.

(30) Foreign Application Priority Data

Nov. 20, 2007 (KR) .................. 10-2007-0118531  
Sep. 18, 2008 (KR) .................. 10-2008-0091774

(51) Int. Cl.  
*G06F 3/041* (2006.01)  
*H04B 13/00* (2006.01)

(52) U.S. Cl.  
CPC ............ *G06F 3/0416* (2013.01); *H04B 13/005* (2013.01)

USPC .................. 345/173; 345/1.2; 345/156

(58) Field of Classification Search  
USPC ............... 345/173, 174, 156, 1.2  
See application file for complete search history.

(56) References Cited

U.S. PATENT DOCUMENTS 5,914,701 A * 6/1999 Gersheneld et al. .......... 345/156  
7,907,895 B2 3/2011 Shinagawa et al.  
(Continued)

FOREIGN PATENT DOCUMENTS

EP 1564917 A1 8/2005  
JP 2007-20895 A 2/2007  
(Continued)

OTHER PUBLICATIONS

Communication from the European Patent Office issued May 7, 2012 in counterpart European Application No. 08169546.2.

(Continued)

*Primary Examiner* — Thuy Pardo  
(74) *Attorney, Agent, or Firm* — Sughrue Mion, PLLC

(57) ABSTRACT

An external device identification method in a device including a touch spot, an apparatus, and a recording medium are provided. The external device identification method includes generating a first micro-current signal that is induced when the touch spot is touched by a human being and includes device information about the device including the touch spot, propagating the first micro-current signal to an external device via a human being, receiving a second micro-current signal including device information about the external device from the external device via the human being, detecting the device information about the external device from the second micro-current signal, identifying the external device by using the device information about the external device, and connecting the device including the touch spot to the external device through a communication channel.

20 Claims, 11 Drawing Sheets

(56) References Cited

U.S. PATENT DOCUMENTS

| | | |
|---|---|---|
| 2002/0122064 A1 | 9/2002 | Yamakado |
| 2004/0189594 A1 | 9/2004 | Sterling |
| 2005/0017841 A1* | 1/2005 | Doi et al. .................... 340/5.65 |
| 2006/0245621 A1 | 11/2006 | Uno |
| 2008/0259043 A1* | 10/2008 | Buil et al. .................... 345/173 |
| 2008/0303682 A1 | 12/2008 | Han |
| 2009/0225036 A1* | 9/2009 | Wright ........................ 345/173 |

FOREIGN PATENT DOCUMENTS

| | | |
|---|---|---|
| KR | 10-2008-0107236 A | 12/2008 |
| WO | 2006/087670 A1 | 8/2006 |

OTHER PUBLICATIONS

Communication, dated Jul. 12, 2013, issued by the State Intellectual Property Office of P.R. China in counterpart Chinese Patent Application No. 200810181351.1.

Communication dated Jan. 13, 2014 issued by the State Intellectual Property Office of P.R. China in counterpart Chinese Application No. 200810181351.1.

Communication dated Oct. 7, 2014 issued by the Korean Intellectual Property Office in counterpart Korean Patent Application No. 10-2008-0091774.

\* cited by examiner

EXTERNAL DEVICE IDENTIFICATION METHOD AND APPARATUS IN A DEVICE INCLUDING A TOUCH SPOT, AND COMPUTER-READABLE RECORDING MEDIUMS HAVING RECORDED THEREON PROGRAMS FOR EXECUTING THE EXTERNAL DEVICE IDENTIFICATION METHOD IN A DEVICE INCLUDING A TOUCH SPOT

CROSS-REFERENCE TO RELATED PATENT APPLICATIONS

This application is a Continuation-In-Part of U.S. patent application Ser. No. 12/274,755, filed on Nov. 20, 2008, which is a Continuation-In-Part of U.S. application Ser. No. 12/133,812, filed on Jun. 5, 2008, which claims priority from Korean Patent Application No. 10-2007-0118531, filed on Nov. 20, 2007, and Korean Patent Application No. 10-2008-0091774, filed on Sep. 18, 2008, in the Korean Intellectual Property Office. The disclosure of each of the above-referenced applications is herein incorporated by reference in their entirety.

BACKGROUND

1. Field

Methods, apparatuses, devices and computer readable recording mediums consistent with exemplary embodiments relate to an external device identification method and apparatus in a device including a touch spot, and a recording medium, and more particularly, to an external device identification method and apparatus in a device including a touch spot, and a recording medium whereby the device including a touch spot can identify an external device, and computer-readable recording medium having recorded thereon programs for executing the above method.

2. Description of the Related Art

In order to technically implement a scenario in which a touch screen device and an external device interact with each other, the external device should be easily connectable to the touch screen device, and preferably the external device has to be connected in relation to coordinates on a graphic user interface (GUI) of the touch screen device.

Related art techniques for a display device to identify an external device include a radio frequency identification (RFID) scheme, a camera scheme, and a global positioning system (GPS) scheme. According to the RFID scheme, a tag reader is installed outside the display device and an RFID tag is attached to the external device in order to recognize an identification (ID) of the external device. According to the camera scheme, a camera is attached on or under a table display in order to recognize the position of the external device. According to the GPS scheme, the position of the external device is recognized using a GPS reception unit.

However, the position of the external device cannot be known according to the RFID scheme, a recognition rate is low and high processor performance is required due to image processing according to the camera scheme, and a position error and device complexity increase in a small space such as the display device according to the GPS scheme.

Moreover, when the size of a touch screen surface is small, the external device and the touch screen device have to easily interact with each other.

SUMMARY

Exemplary embodiments provide an external device identification method, an external device identification apparatus in order to connect a device including a touch spot with an external device by simple physical touching, and a computer-readable recording medium having recorded thereon a program for executing the external device identification method.

According to an aspect of an exemplary embodiment, there is provided an external device identification apparatus in a device including a touch spot. The apparatus includes a transmission unit that generates a first micro-current signal that is induced when a touch spot is touched by a human being and includes device information about the device including the touch spot, and propagates the first micro-current signal to an external device via a human being; a reception unit that receives a second micro-current signal including device information about the external device from the external device via the human being, and detects the device information of the external device from the second micro-current signal; and an identification unit that identifies the external device by using the device information of the external device, and connects the device including the touch spot to the external device through a communication channel.

The device may include another touch spot separate from the touch spot, and the reception unit may receive the second micro-current signal through the touch spot or the another touch spot.

The device may further include a physical operation button or a graphic user interface that displays an operation button, and the apparatus may further include an operation control unit that, at a time at which the physical operation button or the operation button displayed on the graphic user interface is touched by the human being, controls the transmission unit to generate the first micro-current signal and the reception unit to receive the second micro-current signal.

The touch spot may be a touch electrode or a capacitive button.

The touch electrode may be disposed to cover an upper portion of the physical operation button.

The device may include a display screen, and the touch electrode may be disposed on a surface of the device that is opposite from the surface of the display screen.

The capacitive button may be connected by a switch to the transmission unit, the reception unit, and the operation control unit in a time-divisional manner.

The transmission unit may include a signal generation unit that generates a binary signal including device information about the device including the touch spot; and a modulation unit that generates the first micro-current signal by modulating the binary signal, and outputs the first micro-current signal to the touch spot.

The reception unit may include a filter unit that filters a noise component from the second micro-current signal; an amplification unit that amplifies the filtered second micro-current signal output from the filter unit; and a demodulation unit that detects the binary signal including device information about the external device by demodulating the signal output from the amplification unit.

The device including the touch spot may be a remote controller for controlling the external device remotely.

According to an aspect of another exemplary embodiment, there is provided an external device identification method in a device including a touch spot. The method includes generating a first micro-current signal that is induced at a time at which a touch spot is touched by a human being and includes device information about the device including the touch spot; propagating the first micro-current signal to an external device via the human being; receiving a second micro-current signal including device information about the external device from the external device via the human being; detecting the device information about the external device from the second micro-current signal; identifying the external device by using the device information about the external device; and connecting the device including the touch spot to the external device through a communication channel.

The device may include another touch spot that is separate from the touch spot, and the receiving of the second micro-current signal may include receiving the second micro-current signal through the touch spot or the another touch spot.

The device may include a physical operation button or graphic user interface, and the method may further include controlling the device to generate the first micro-current signal and to receive the second micro-current signal, at a time at which the physical operation button or an operation button displayed on the graphic user interface is touched by the human being.

The touch spot may be a touch electrode or a capacitive button.

The touch electrode may be disposed to cover an upper portion of the physical operation button.

The device may include a display screen, and the touch electrode may be disposed on a surface of the device that is opposite to the surface of the display screen.

The capacitive button may be used to propagate the first micro-current signal to the external device, to receive the second micro-current signal from the external device, and to control the generation of the first micro-current signal and receipt of the second micro-current signal in a time-divisional manner.

The propagating of the first micro-current signal may include generating a binary signal including device information about the device including the touch spot; and generating the first micro-current signal by modulating the binary signal and outputting the first micro-current signal to the touch spot.

The detecting of the device information about the external device may include removing a noise component from the second micro-current signal; amplifying the second micro-current signal from which the noise component is removed; and detecting a binary signal including device information about the external device by demodulating the amplified signal.

The device including the touch spot may be a remote controller for controlling the external device remotely.

According to an aspect of another exemplary embodiment, there is provided a computer readable recording medium having embodied thereon a program for executing an external device identification method in a device including a touch spot. The method includes generating a first micro-current signal that is induced when a touch spot is touched by a human being and includes device information about the device including the touch spot, and propagating the first micro-current signal to an external device via the human being; receiving a second micro-current signal including device information about the external device from the external device via the human being, and detecting the device information about the external device from the second micro-current signal; and identifying the external device by using the device information about the external device, and connecting the device including the touch spot to the external device through a communication channel.

According to an aspect of another exemplary embodiment, there is provided a device comprising a touch spot; a transmission unit that generates a first micro-current signal that is induced at a time at which the touch spot is touched by a human being and includes device information about the device, and propagates the first micro-current signal to an external device via the human being; a reception unit that receives a second micro-current signal including device information about the external device from the external device via the human being, and detects the device information of the external device from the second micro-current signal; and an identification unit that identifies the external device by using the device information of the external device; and connects the device to the external device through a communication channel other than the human being.

BRIEF DESCRIPTION OF THE DRAWINGS

The above and other aspects will become more apparent by describing in detail exemplary embodiments with reference to the attached drawings in which.

DETAILED DESCRIPTION

Figure 1:
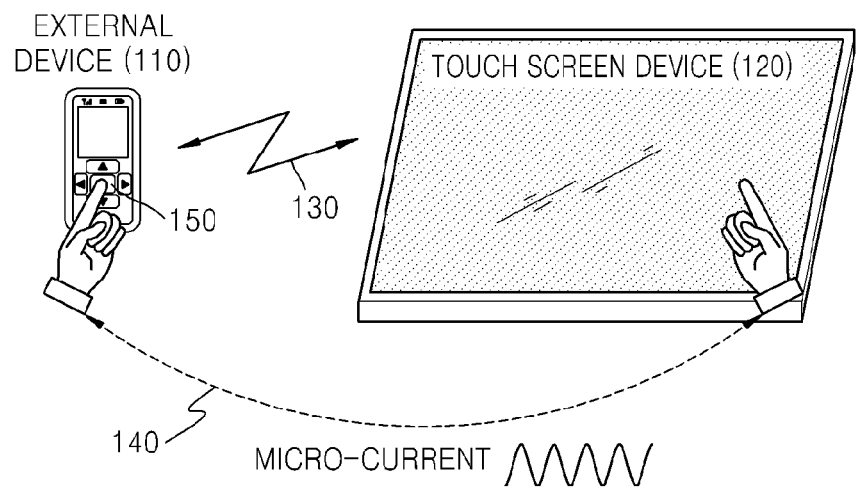
FIG. 1 illustrates a touch-screen based device identification system according to a first exemplary embodiment.

Hereinafter, exemplary embodiments will be described in detail with reference to the accompanying drawings. It should be noted that like reference numerals refer to like elements illustrated in one or more of the drawings. In the following description, detailed descriptions of known functions and configurations incorporated herein will be omitted for conciseness and clarity.

FIG. 1 illustrates a touch-screen based device identification system according to a first exemplary embodiment.

Referring to FIG. 1, the touch-screen based device identification system includes an external device 110 and a touch screen device 120. The external device 110 and the touch screen device 120 are connected with each other through a communication channel 130. It is assumed that a person 140 touches a touch screen surface of the touch screen device 120 with one hand while holding the external device 110 with the other hand. In another exemplary embodiment, a person 140 may touch a touch screen surface of the touch screen device 120 using a conductive medium such as metal.

The external device 110 is a consumer electronics (CE) device capable of communicating with another device through the communication channel 130. The external device 110 may be a cellular phone, a digital camera, a camcorder, a personal digital assistant (PDA), an MP3 player, or a portable multimedia player (PMP). In another exemplary embodiment, the external device 110 may be another touch screen device in addition to the touch screen device 120.

A signal induced by touching a touch screen surface of the touch screen device 120 propagates to the external device 110 via the person 140. A detection unit 150 of the external device 110 detects a scan frequency component from the signal induced by a touch of the touch screen surface in the touch screen device 120.

Upon detection of the scan frequency component, the external device 110 generates information about the detected scan frequency component and ID device information of the external device 110 and transmits the generated information and ID information to the touch screen device 120 through the communication channel 130. The external device 110 may include a band pass filter unit that detects a micro-current signal that is induced from the touch screen surface and is received via the person 140. The micro-current signal propagating to the external device 110 is detected after passing through the band pass filter unit of the external device 110.

The touch screen device 120 is a device capable of performing specific processing by recognizing the position of a character or a particular position on the touch screen surface, which is touched by a human hand, without using a keyboard. A touch-screen scheme may be classified into different types including, for example, a resistive film type, a static capacitance type, etc. According to the static capacitance type, the touch screen surface is electrically charged, sensors are installed along the circumference of the touch screen surface, and a touched position is recognized by sensing the amount of electric charges lost by a touch.

Herein, the touch screen device 120 may be adapted by the static capacitance type. According to the static capacitance type, the touch screen device 120 performs a periodic scan in order to sense a touch. However, the touch screen device 120 is not limited to the static capacitance type, and may include all kinds of devices in which micro-current signals including a certain frequency (for example, scan frequency) are induced when the touch screen surface is touched.

According to the static capacitance type, the touch screen device 120 performs the scanning operation regularly to sense the touch. Thus, when the person 140 touches the touch screen surface of the touch screen device 120 with one hand while holding the external device 110 with the other hand, a micro-current including a particular frequency, e.g., a scan frequency, is induced by touching the touch screen surface. A micro-current signal including a scan frequency component, which is induced by touching the touch screen surface, propagates to the external device 110 via the person 140.

The touch screen device 120 also receives information about the scan frequency component detected by the detection unit 150 and an ID of the external device 110 from the external device 110 through the communication channel 130. The touch screen device 120 recognizes that the touch screen device 120 is connected with the external device 110 via the person 140 by using the information about the detected scan frequency component and the ID of the external device 110, which are received from the external device 110.

In addition, in order to distinguish the touch screen device 120 that propagates the induced signal from a plurality of touch screen devices, the external device 110 may broadcast confirmation request signals, which identify whether the touch screen surface of the touch screen device 120 is touched, to a plurality of touch screen devices through communication channels. Then, the touch screen device 120, which propagates the signal induced by touching the touch screen surface to the external device 110, may transmit a confirmation response signal that notifies about the touch to the touch screen surface to the external device 110 through the communication channel 130. The other touch screen devices, touch screen surfaces of which are not touched, may not transmit the confirmation response signal to the external device 110.

The communication channel 130 is a data transmission/reception path that is previously established before the person 140 touches the external device 110 and the touch screen device 120. Thus, the external device 110 and the touch screen device 120 are in a state in which data can be exchanged through the communication channel 130 whenever needed.

The communication channel 130 is a local connection using a plug-and-play (PnP) protocol such as a universal PnP (UPnP) protocol and may be a wired or wireless channel. In addition, the communication channel 130 may be a wireless communication channel, and the wireless communication channel may include one or more of a wireless local area network (LAN), a wireless internet platform for interoperability (WIPI), Bluetooth, infrared communication, near field communication (NFC), or Zigbee, etc.

In addition, the external device 110 exchanges information about the communication channel (for example, wireless communication channel) with the touch screen device 120, and may communicate through the selected communication channel based on the exchanged information. For example, when the external device 110 or the touch screen device 120 includes a plurality of communication channels, the external device 110 notifies the touch screen device 120 of the communication channels included in the external device 110, and the touch screen device 120 may select the appropriate communication channel by comparing the communication channels of the external device 110 with the communication channels of the touch screen device 120.

The person 140 can cause the external device 110 and the touch screen 120 to interact with each other by touching the touch screen surface of the touch screen device 120 with one hand while holding the external device 110 with the other hand. Since a human body is composed mostly of water including salt, the human body generally has the characteristics of a conductor at tens of KHz. Thus, a micro-current signal may propagate between the external device 110 and the touch screen 120 via the body of the person 140 who touches the external device 110 and the touch screen 120. In this state, the touch screen device 120 acts as if a position touched by the hand of the person 140 is touched by the external device 110 and can perform particular processing. That is, the touch screen device 120 calculates the first coordinates of the touched point on the touch screen surface, and then, maps the external device 110 to the first coordinates. Here, mapping allows various applications to be executed as if the external device 110 touches the first coordinates.

In addition, when the external device 110 stores personal information or verification information (hereinafter, referred to as 'user verification information'), services that allow the external device to access the touch screen device 120 or allow the external device to access the object displayed on the first coordinates of the touch screen device 120 can be provided using the user verification information.

In addition, as described above, the external device 110 may be another touch screen device in addition to the touch screen device 120.

Figure 7:
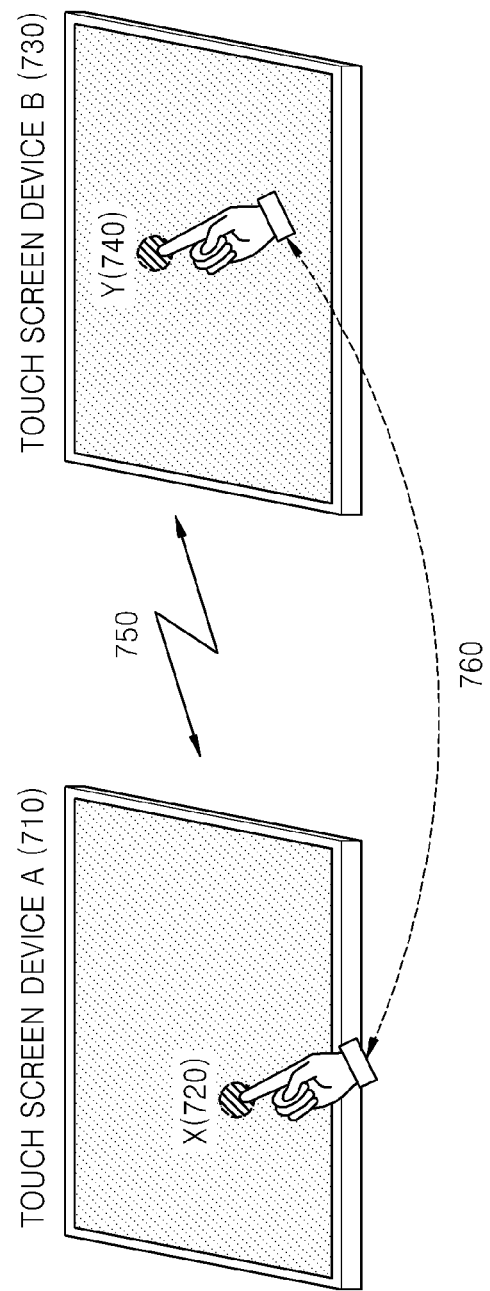
FIG. 7 illustrates a touch-screen based device identification system according to a fourth exemplary embodiment.

FIG. 7 illustrates that the external device 110 may be another touch screen device. Referring to FIG. 7, processes for a touch screen device A 710 to identify a touch screen device B 730 via person 760 (or the opposite direction) are similar to those of the exemplary embodiment shown in FIG. 1. However, the touch screen devices A and B 710 and 730 may include detection units for detecting signals that are induced on touch screen surfaces of the counterpart touch screen devices 710 or 730 and are propagated. The detection units may be installed in the touch screen surface or on a position separated from the touch screen surface. The detection of the induced signals has been described already with reference to FIG. 1, and thus, detailed descriptions thereof are omitted.

The touch screen device A 710 calculates first coordinates X 720 that represent touched location on the touch screen surface of the touch screen device A 710, and the touch screen device B 730 calculates second coordinates Y 740 that represent touched location on the touch screen surface of the touch screen device B 730. After that, the touch screen devices A and B 710 and 730 may perform the mapping operation of the first and second coordinates X 720 and Y 740 through a communication channel 750. Then, the touch screen devices A 710 and B 730 may execute an application service that links the first coordinates X 720 with the second coordinates Y 740 based on a result of the mapping operation. Through the above linkage between the coordinates, application services according to states of the touch screen devices and intention of the user can be provided.

For example, the touch screen device A 710 may transmit a control signal for allowing the object displayed on the first coordinates X 720 of the touch screen device A 710 (for example, icons, characters, products, or colors) to be displayed on the second coordinates Y 740 of the touch screen device 730 to the touch screen device B 730, or receives the control signal from the touch screen device B 730. For example, the color represented on the first coordinates X 720 may be equally displayed on the second coordinates Y 740, and the product displayed on the first coordinates X 720 may be moved to the second coordinates Y 740. On the other hand, the color represented on the second coordinates Y 740 may be equally displayed on the first coordinates X 720, and the product displayed on the second coordinates Y 740 may be moved to the first coordinates X 720.

Otherwise, a user interface such as a pop-up menu may be displayed in the touch screen devices, and thus, the user of the touch screen device A 710 or the touch screen device B 730 may select one of a plurality of services, coordinates of which can be linked with each other.

Figure 2:
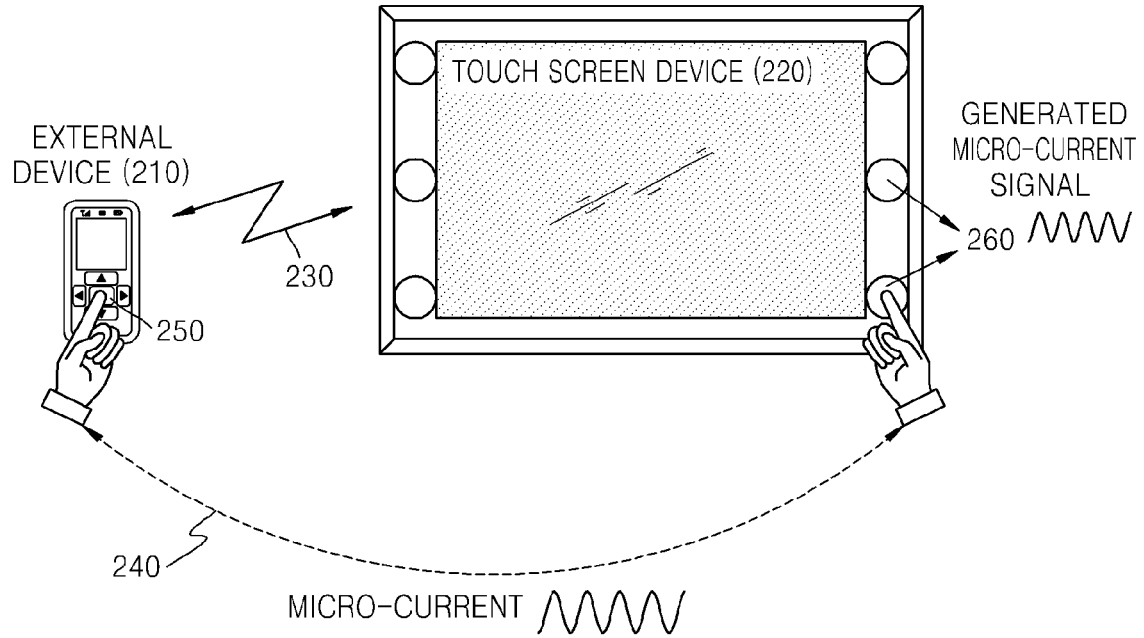
FIG. 2 illustrates a touch-screen based device identification system according to a second exemplary embodiment.

FIG. 2 illustrates a touch-screen based device identification system according to a second exemplary embodiment.

An external device 210, a communication channel 230, a person 240, and a reception unit 250, which are illustrated in FIG. 2, operate in the same manner, respectively, as the external device 110, the communication channel 130, the person 140, and the detection unit 150, which are illustrated in FIG. 1, and thus will not be described again.

While the touch screen device 120 illustrated in FIG. 1 operates by touching the touch screen surface, a touch screen device 220 illustrated in FIG. 2 operates by touching one of touch spots 260 installed along the circumference of the touch screen device 220. In other words, the touch screen 220 illustrated in FIG. 2 operates by a touch to the touch spot 260 instead of to the touch screen surface.

The person 240 indicates a particular position on the touch screen surface by touching the touch spot 260 in order to cause the touch screen device 220 to perform particular processing. The touch spot 260 is designed so that a micro-current having a scan frequency component can flow through the touch spot 260. Thus, once the person 240 touches the touch spot 260, a micro-current signal propagates to the external device 210 via the person 240. The touch screen device 220 receives information about the scan frequency component and an ID of the external device 210 from the external device 210.

Consequently, if the person 240 touches the touch spot 260 of the touch screen device 220 with one hand, the touch screen device 220 can recognize that the touch screen device 220 is connected with the external device 210 the person 240 holds with the other hand.

Figure 3:
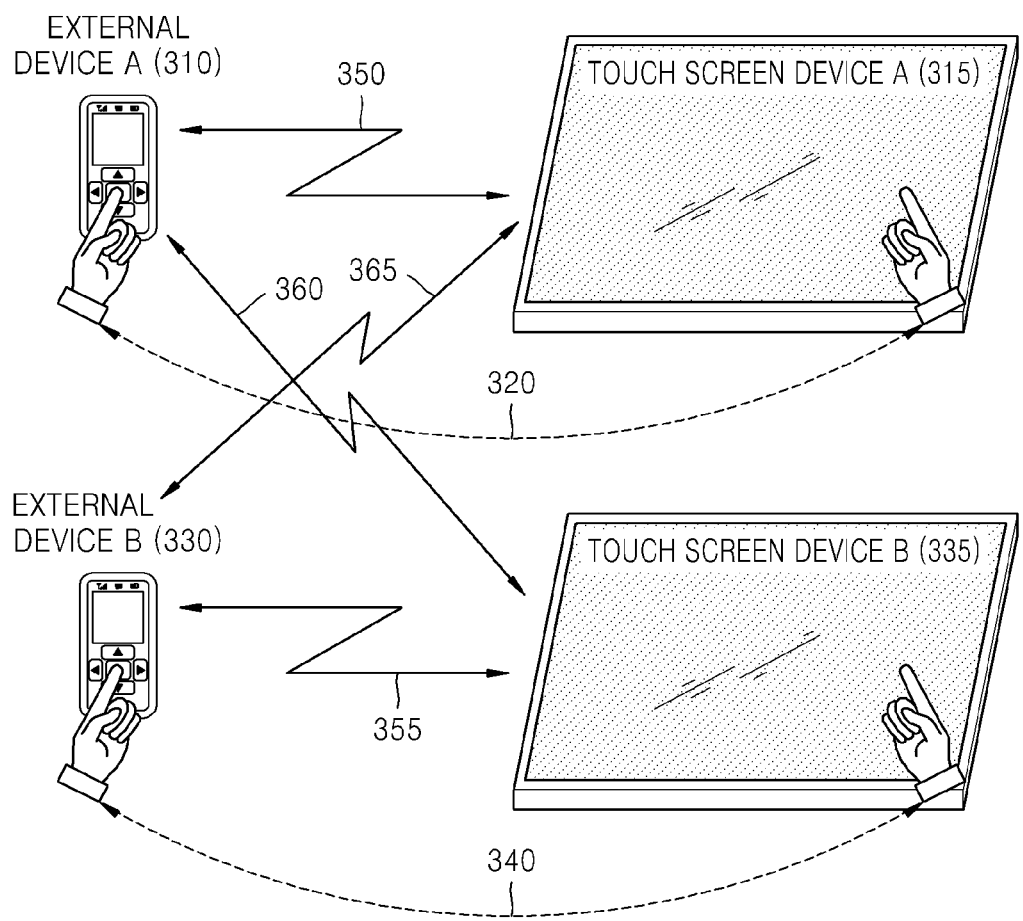
FIG. 3 illustrates a touch-screen based device identification system according to a third exemplary embodiment.

FIG. 3 illustrates a touch-screen based device identification system according to a third exemplary embodiment, in which there exists a plurality of external devices 310 and 330 or a plurality of touch screen devices 315 and 335.

For example, it is assumed that a person A 320 holds an external device A 310 with one hand and touches a touch screen device A 315 with the other hand. It is also assumed that a person B 340 holds an external device B 330 with one hand and touches a touch screen device B 335 with the other hand. If the person A 320 and the person B 340 touch the touch screen device A 315 and the touch screen device B 335, respectively, at almost the same time; the external devices A 310 and B 330 transmit information about scan frequency components and an ID of the external devices 310 and 320 to the touch screen device A 315 and the touch screen device B 335 through communication channels 350 and 360 and communication channels 355 and 365, respectively. However, if the scan frequencies of micro-current signals induced in the touch screen devices A 315 and B 335 are the same as each other, the touch screen device A 315 or B 335 cannot recognize which one of the external devices A 310 and B 330 it is connected with.

In this case, the touch screen device A 315 or B 335 may be designed in such a way as to change a scan frequency of a micro-current signal induced by touching a touch screen surface. For example, when the touch screen device A 315 or B 335 receives scan frequency information and an ID from the plurality of external devices 310 and 330 within a predetermined period of time, the touch screen device A 315 or B 335 temporarily changes a scan frequency. The touch screen device A 315 or B 335 then receives scan frequency information corresponding to the changed scan frequency and an ID from the external devices 310 and 330 again. However, if both the touch screen device A 315 and the touch screen device B 335 change scan frequencies to another same frequency, the situation described above may occur again. This situation may be addressed by using a method of randomly determining a point of time for changing the scan frequency of the touch screen device A 315 or B 335 within a time range. However, in order to prevent the scan frequencies of the touch screen device A 315 and the touch screen device B 335 from being simultaneously changed to another same scan frequency, various methods may be used without being limited to the method described above.

Subsequently, the touch screen device A 315 or B 335 can identify the external device 310 or 330 connected with the touch screen device A 315 or B 335 by temporarily changing the scan frequency of the touch screen device A 315 or B 335.

Figure 4:
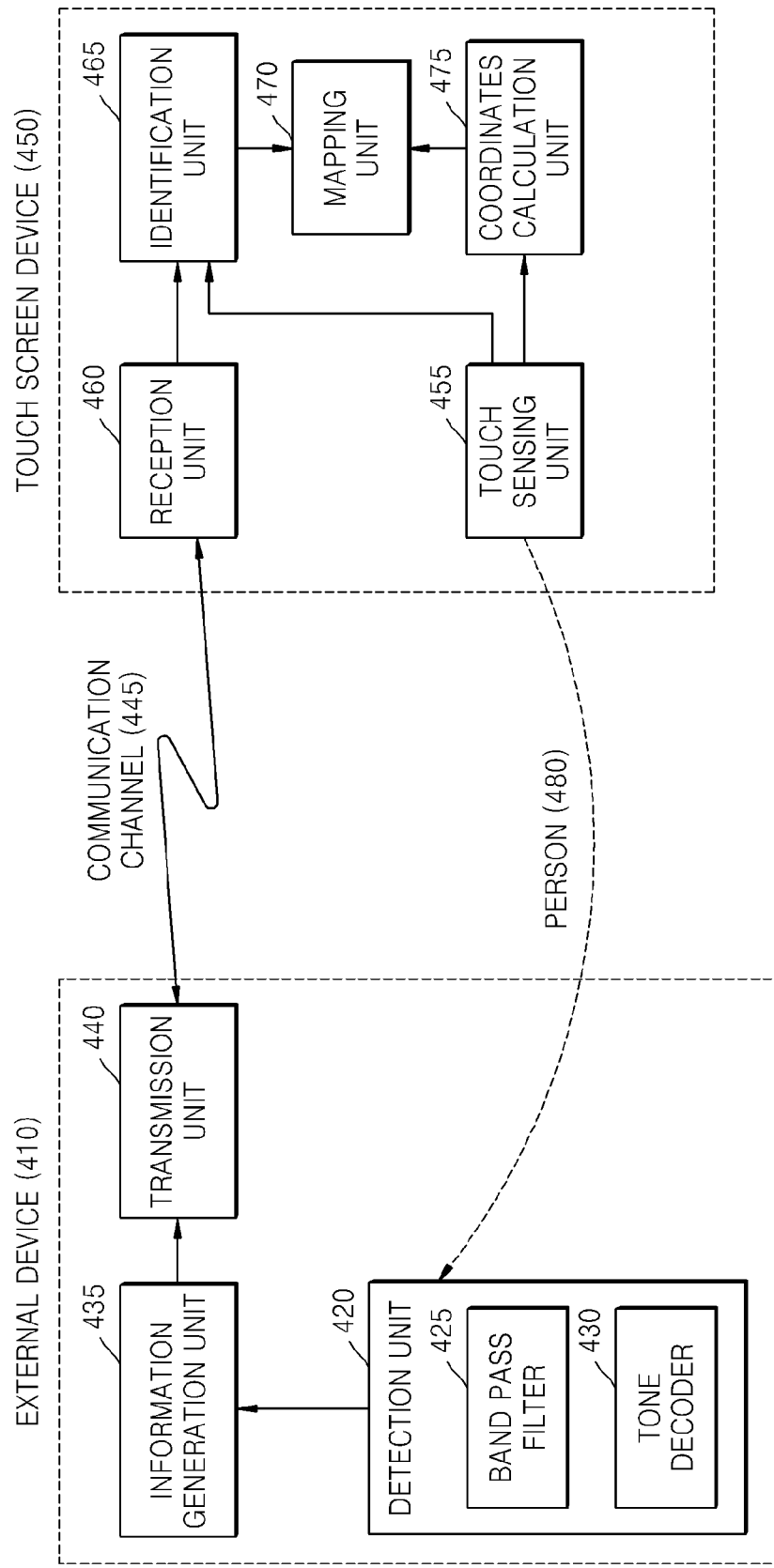
FIG. 4 is a block diagram of a touch-screen based device identification system according to an exemplary embodiment.

FIG. 4 is a block diagram of a touch-screen based device identification system according to an exemplary embodiment.

Referring to FIG. 4, the touch-screen based device identification system includes an external device 410 and a touch screen device 450. The external device 410 and the touch screen device 450 are coupled to each other through a communication channel 445. A person 480 touches a detection unit 420 of the external device 410 with one hand and touches a touch sensing unit 455, i.e., a touch screen surface, of the touch screen device 450 with the other hand.

The touch screen device 450 may include the touch sensing unit 455, a reception unit 460, and an identification unit 465. The touch screen device 450 may further include a mapping unit 470 and a coordinates calculation unit 475.

The touch sensing unit 455 generates a signal induced by touching the touch screen surface. The induced signal is a micro-current signal including a scan frequency component and propagates to the detection unit 420 of the external device 410 via the person 480.

The touch sensing unit 455 can temporarily change a scan frequency of the micro-current signal induced by touching the touch screen surface.

The reception unit 460 receives information about the scan frequency component detected by the external device 410 and an ID of the external device 410 through the communication channel 445.

The identification unit 465 identifies the external device 410 by using the information about the scan frequency component and the ID of the external device 410, which are received by the reception unit 460. For example, the identification unit 465 determines a scan frequency based on the information about the scan frequency component and compares the determined scan frequency with a scan frequency of the micro-current signal induced by a touch. If the determined scan frequency is the same as the scan frequency of the induced micro-current signal, the identification unit 465 determines that the touch screen device 450 is connected with the external device 410 having the received ID. Information about the scan frequency of the micro-current signal induced by a touch of the person 480 may be received from the touch sensing unit 455 or may be stored in the identification unit 465.

The coordinates calculation unit 475 calculates coordinates of the touch screen surface touched (that is, first coordinates).

The mapping unit 470 maps the coordinates of the touch screen surface touched to the identified external device 410. By doing so, the touch screen device 450 can act as if a position touched by a hand of the person 480 is touched using the external device 41 and can perform particular processing.

The external device 410 includes a detection unit 420, an information generation unit 435, and a transmission unit 440. The external device 410 may be, for example, a cellular phone, a digital camera, a camcorder, a portable digital assistant (PDA), an MP3 player, or a portable media player (PMP).

The detection unit 420 detects a scan frequency component from a micro-current signal propagating from the touch sensing unit 455 and transmits the detected scan frequency component to the information generation unit 435. For example, the detection unit 420 may include a band pass filter unit 425 and a tone decoder 430. The band pass filter unit 425 performs band pass filtering on the micro-current signal by using a scan frequency as a center frequency. The tone decoder 430 performs tone-decoding on the band-pass filtered signal output from the band pass filter unit 425. As a result, the detection unit 420 outputs information indicating whether the scan frequency component is included in the micro-current signal.

The information generation unit 435 generates information about the scan frequency component and ID device information of the external device 435 that has received the micro-current signal. The information generation unit 435 previously stores the ID device information of the external device 410.

The transmission unit 440 transmits the information about the scan frequency component and the ID device information of the external device 410 to the reception unit 460 of the touch screen device 450 through the communication channel 445.

In addition, the external device 410 may be another touch screen device in addition to the touch screen device 450. In this case, the mapping unit 470 may map the second coordinates of the external device 410 to the first coordinates of the touch screen device 450. The mapping unit 470 may perform the mapping operation through the communication channel 445.

In addition, the mapping unit 470 may control a control signal, which allows the object displayed on the first coordinates to be displayed on the second coordinates, transmitted to the external device 410 or received from the external device 410. Consequently, the external device 410 or the touch screen device 450 may execute various application services caused by the linkage between the first and second coordinates based on the mapping result.

The communication channel 445 may be a wired or wireless channel using a PnP protocol such as a UPnP protocol.

Figure 8:
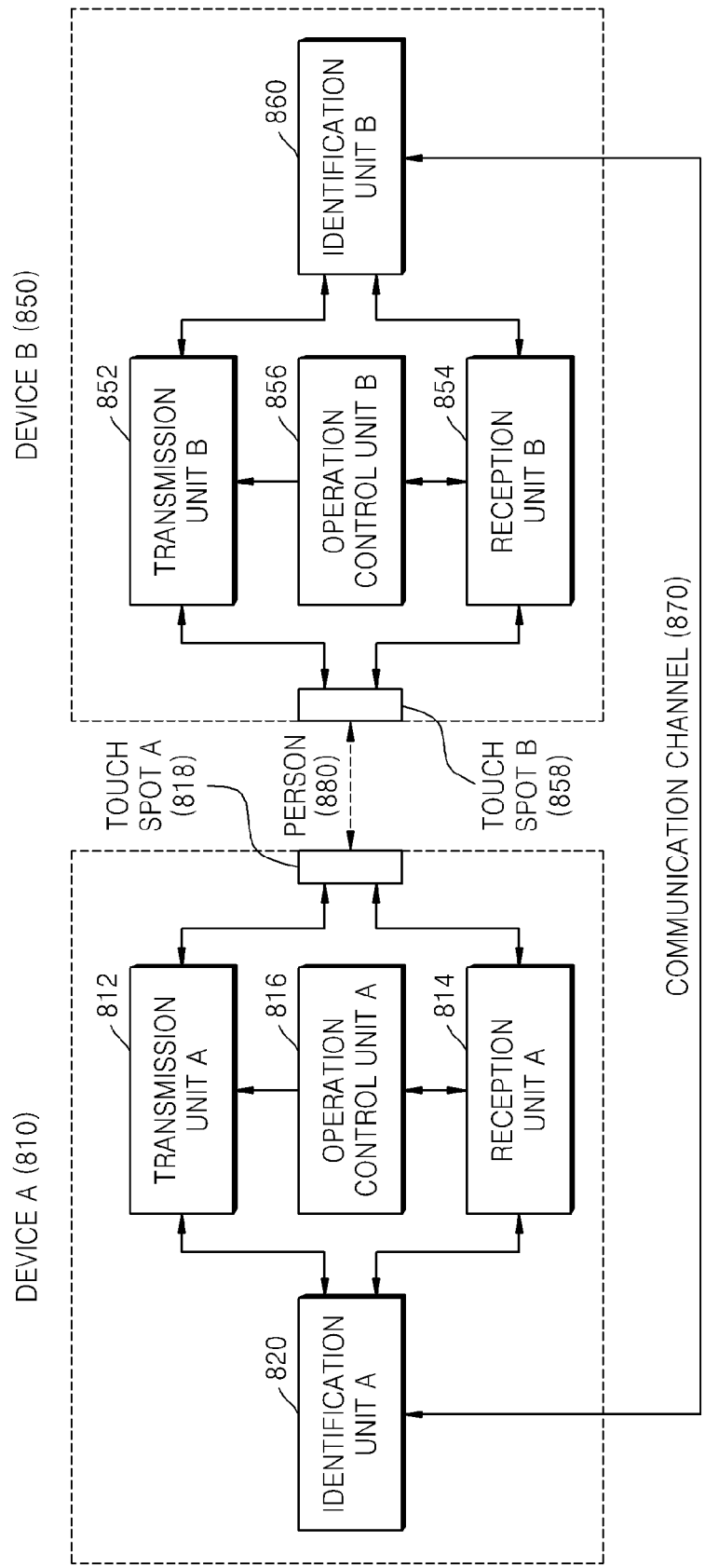
FIG. 8 is a block diagram of an external device identification system according to an exemplary embodiment.

FIG. 8 is a block diagram of an external device identification system according to another exemplary embodiment.

Referring to FIG. 8, the external device identification system includes a device A 810 and a device B 850. The device A 810 and the device B 850 may be respectively portable mobile devices such as a mobile phone, a digital camera, a camcorder, a personal digital assistant (PDA), an MP3 player, or a personal multimedia player (PMP), etc. In addition, the device A 810 (or the device B 850) may be a remote controller for controlling the device B 850 (or the device A 810) remotely.

The device A 810 and the device B 850 are coupled to each other via a communication channel 870. In addition, a person 880 touches a touch spot A 818 of the device A 810 with a finger or hand, and touches a touch spot B 858 of the device B 850 with another finger or hand.

The device A 810 includes a transmission unit A 812, a reception unit A 814, and an identification unit A 820. In addition, the device A 810 may further include an operation control unit A 816. Similarly, the device B 850 includes a transmission unit B 852, a reception unit B 854, and an identification unit B 860. In addition, the device B 850 may further include an operation control unit B 856. The device A 810 and the device B 850 have configurations corresponding to each other. Therefore, only the device A 810 will be described in more detail for the sake of convenience of description.

The transmission unit A 812 generates a first micro-current signal that is conveyed by the touch of the touch spot A 818. Here, the first micro-current signal includes equipment information of the device A 810. The equipment information of the device A 810 is information used to connect through the communication channel 870 to the device B 850, for example, identification information of the device A 810. After that, the transmission unit A 812 propagates the first micro-current signal to the device B 850 via the person 880.

The reception unit A 814 receives a second micro-current signal from the device B 850 via the person 880. Here, the second micro-current signal includes equipment information of the device B 850. The equipment information of the device B 850 is information used to connect through the communication channel 870 to the device A 810, for example, identification information of the device B 850. After that, the reception unit A 814 detects the equipment information from the second micro-current signal.

As shown in FIG. 8, the transmission unit A 812 and the reception unit A 814 may transmit the first micro-current signal and receive the second micro-current signal through the same touch spot A 818. Alternatively, the transmission unit A 812 and the reception unit A 814 may respectively transmit the first micro-current signal and receive the second micro-current signal through different touch spots (not shown) from each other. In this case, the touch spot connecting to the transmission unit A 812 and the touch spot connecting to the reception unit A 814 may be adjacent to each other.

The identification unit A 820 identifies the device B 850 by using the equipment information of the device B 850 detected by the reception unit A 814. Then, the identification unit A 820 connects the device A 810 and the device B 850 to each other via the communication channel 870. The communication channel 870 may be locally connected via a PnP protocol such as a UPnP, and may be a wired or wireless channel. In addition, the communication channel 130 may be a wireless communication channel, and the wireless communication channel may include one or more of a local area network (LAN), a wireless internet platform for interoperability (WIPI), Bluetooth, an infrared ray, a near field communication (NFC), or Zigbee, etc.

The operation control unit A 816 is connected to a physical operation button (not shown) included in the device A 810 or an operation button (not shown) displayed on a graphic user interface. For example, when the physical operation button or the operation button displayed on the graphic user interface is pushed, the operation control unit A 816 controls the transmission unit A 812 to generate the first micro-current signal and the reception unit A 814 to receive the second micro-current signal. When the physical operation button or the operation button displayed on the graphic user interface is not pushed, the operation control unit A 816 controls the transmission unit A 812 not to generate the first micro-current signal and the reception unit A 814 to receive the second micro-current signal.

Users of the device A 810 and the device B 850 may manipulate the device A 810 and the device B 850 to be connected only when the physical operation button or the operation button displayed on the graphic user interface in each of the devices is pushed.

Figure 9A:
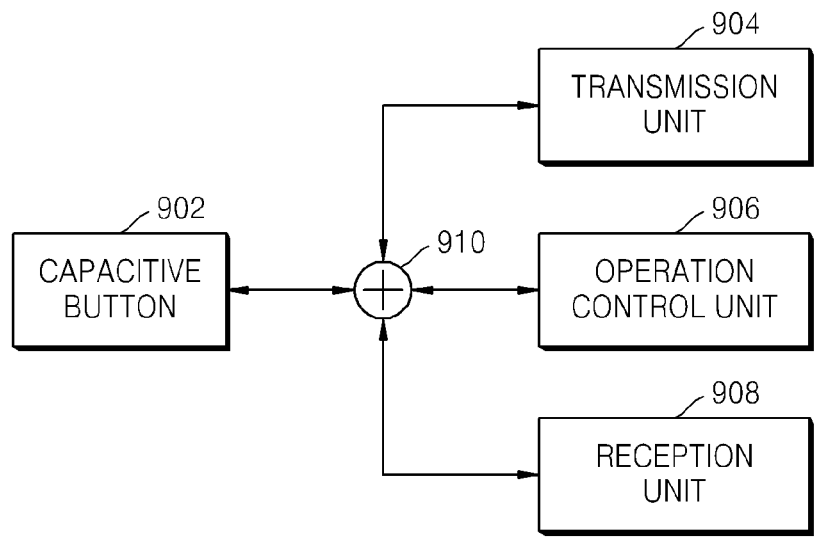
FIGS. 9A, 9B, and 9C are exemplary views showing touch spots, according to exemplary embodiments.
Figure 9B:
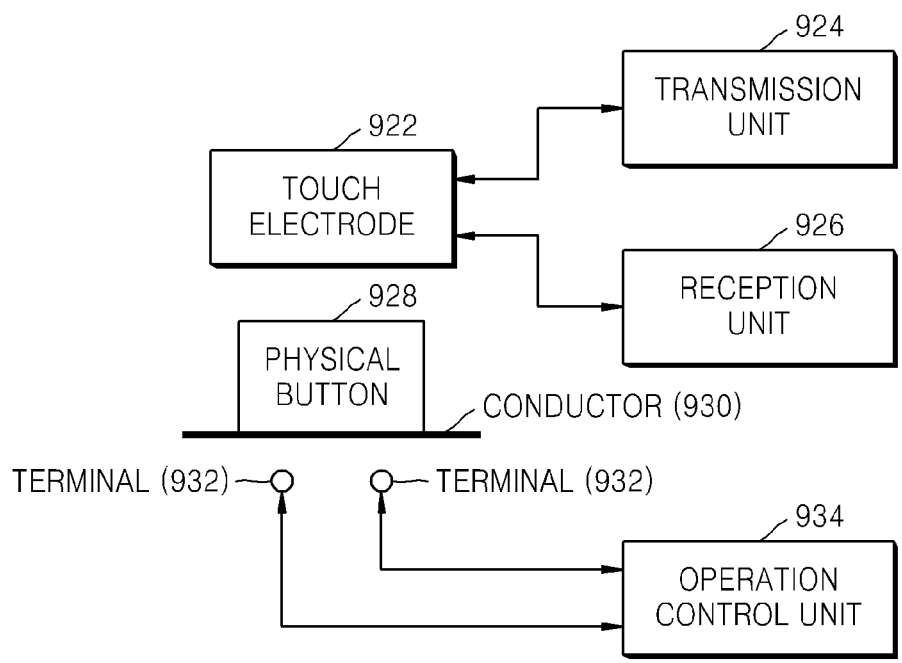
Figure 9C:
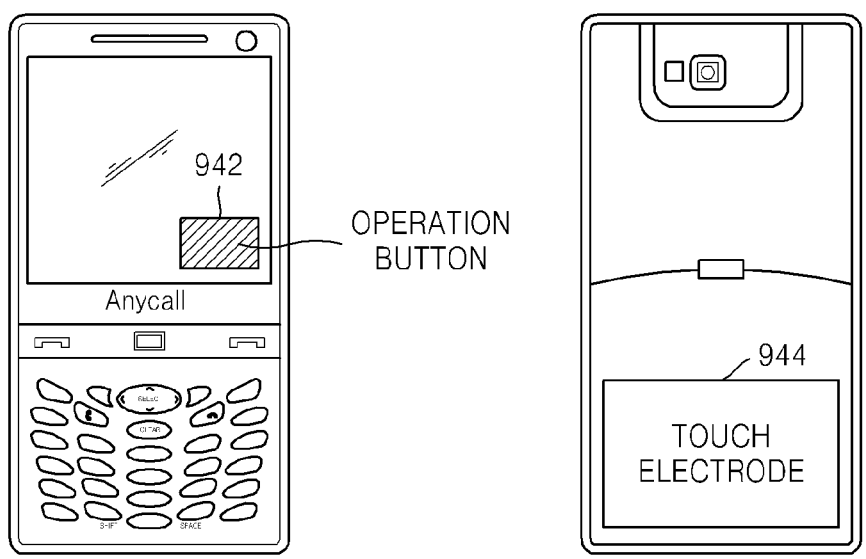

FIGS. 9A, 9B, and 9C are diagrams showing examples of touch spots according to exemplary embodiments.

FIG. 9A shows an example in which the touch spot is a capacitive button 902. The capacitive button 902 is used as the touch spot for transmitting or receiving the micro-current signal, and at the same time, may be used as an operation button for performing a connecting operation between the devices. For example, the capacitive button 902 may be connected to a transmission unit 904, a reception unit 908, and an operation control unit 906 in a time divisional manner. That is, a switching unit 910 switches the connection from the capacitive button 902 to the transmission unit 904, the reception unit 908, and the operation control unit 906 at different times. The user of the device starts a connecting operation between the devices by using one button (that is, the capacitive button), and at the same time, transmits and receive the micro-current signals. The transmission unit 904, the reception unit 908, and the operation control unit 906 correspond to the transmission unit 812, the reception unit 814, and the operation control unit 816 of FIG. 8, and detailed descriptions are not provided here.

FIGS. 9B and 9C shows examples when the touch spots are touch electrodes 922 and 944, respectively. The touch electrodes 922 and 944 are used to transmit or receive the micro-current signal, and a physical operation button 928 or an operation button 942 displayed on graphic user interface is used to start the connecting operation between the devices.

FIG. 9B is shows an example in which the touch electrode 922 is disposed to cover an upper portion of the physical operation button 928.

The touch electrode 922 is connected to a transmission unit 924 and a reception unit 926, and the physical operation button 928 operates an operation control unit 934 via a conductor 930 and a terminal 932 in a touched status. That is, when the touch electrode 922 is pushed, the physical operation button 928 is pushed together with the touch electrode 922 such that the conductor 930 of the physical operation button 928 is pressed against the terminals 932. Therefore, it is possible to start the connecting operation between the devices and transmit or receive the micro-current signal by touching the touch electrode 922. The transmission unit 924, the reception unit 926, and the operation control unit 934 correspond to the transmission unit 812, the reception unit 814, and the operation control unit 816 of FIG. 8, and detailed descriptions are not provided here.

FIG. 9C is an exemplary diagram showing the touch electrode 944 disposed on a rear surface of a display screen in the device.

The touch electrode 944 is connected to a transmission unit (not shown) and a reception unit (not shown), and an operation button 942 displayed on the graphic user interface operates an operation control unit (not shown) in a touched status (that is, commanded to operate). Therefore, the operation button 942 displayed on the graphic user interface is pushed to start the connecting operation between the devices, and the touch electrode 944 is touched to transmit and receive the micro-current signals through the hand of the user. The transmission unit (not shown), the reception unit (not shown), and the operation control unit (not shown) correspond to the transmission unit 812, the reception unit 814, and the operation control unit 816 of FIG. 8, and detailed descriptions are not provided here.

Figure 10A:
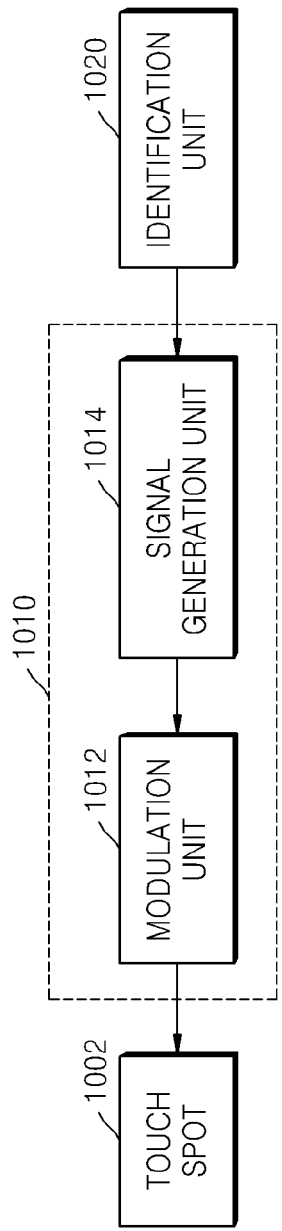
FIG. 10A is a diagram showing an internal structure of a transmission unit of FIG. 8.

FIG. 10A is an exemplary diagram showing an internal structure of the transmission unit 812 or 852 shown in FIG. 8.

The transmission unit 1010 corresponding to the transmission unit A 812 (or the transmission unit B 852) includes a signal generation unit 1014 and a modulation unit 1012.

The signal generation unit 1014 generates a signal including device information about the device having a touch spot 1002 (that is, the device A or device B of FIG. 8). The signal may be, for example, a binary signal. The device information about the device having the touch spot 1002 is stored in the signal generation unit 1014 or in an identification unit 1020.

The modulation unit 1012 generates a first micro-current signal by modulating the signal generated by the signal generation unit 1014, and outputs the first micro-current signal to the touch spot 1002. The modulation method may be any modulation method, for example, an on-off keying (OOK) method. In addition, the modulation unit 1012 may include a band pass filter unit that filters a frequency band.

Figure 10B:
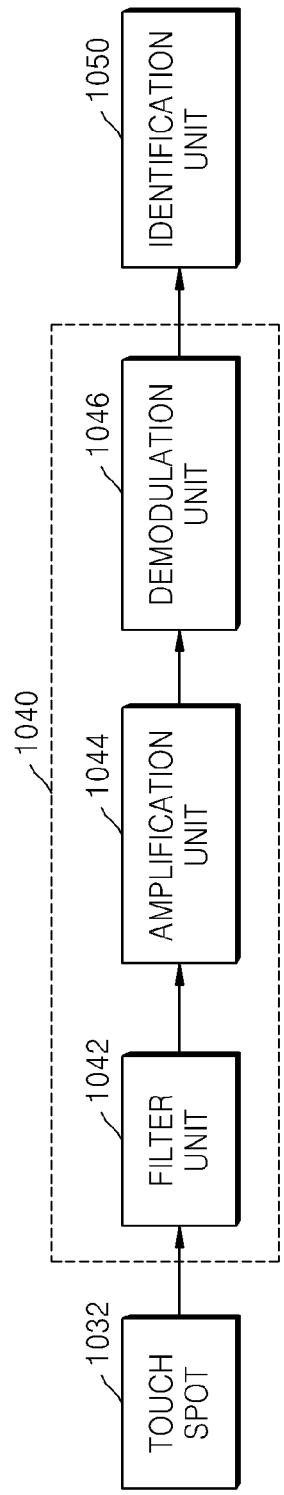
FIG. 10B is a diagram showing an internal structure of a reception unit of FIG. 8.

FIG. 10B is an exemplary diagram showing a structure of the reception unit A 814 (or the reception unit B 854) of FIG. 8.

The reception unit 1040 corresponding to the reception unit A 814 (or the reception unit B 854) includes a filter unit 1042, an amplification unit 1044, and a demodulation unit 1046.

The filter unit 1042 removes a noise component from a second micro-current signal received through the touch spot 1032. Since the second micro-current signal is transmitted via a human being, the second micro-current signal generally include the noise component.

The amplification unit 1044 amplifies the signal output from the filter unit 1042.

The demodulation unit 1046 demodulates the signal output from the amplification unit 1044 to detect the signal including the information about an external device (not shown). The demodulation method may vary depending on modulation method used.

Figure 5:
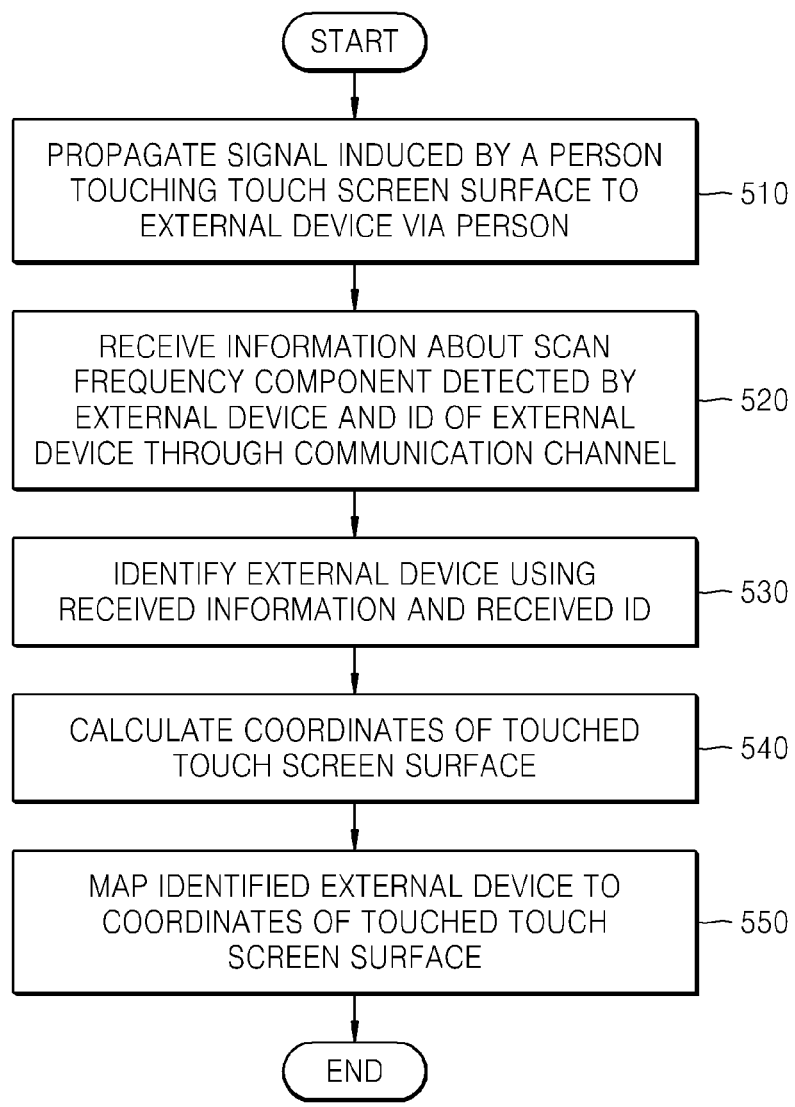
FIG. 5 is a flowchart illustrating a touch-screen based device identification method for a touch screen device according to an exemplary embodiment.

FIG. 5 is a flowchart illustrating a touch-screen based device identification method for a touch screen device according to an exemplary embodiment.

Referring to FIG. 5, in operation 510, the touch screen device propagates a micro-current signal, including a scan frequency component, induced by touching a touch screen surface to an external device via a person. The external device may be, for example, a cellular phone, a digital camera, a camcorder, a PDA, an MP3 player, or a PMP, etc. The touch screen device may temporarily change a scan frequency of a micro-current induced by touching the touch screen surface.

In operation 520, receives information about the scan frequency component detected by the external device and an ID of the external device from the external device through a communication channel. The communication channel may be a wired or wireless channel using a PnP protocol such as an UPnP protocol.

In operation 530, the touch screen device identifies the external device by using the received information about the scan frequency component and the received ID of the external device. For example, the touch screen device may determine that the touch screen is connected with the external device having the received ID if the received information about the scan frequency component is the same as a scan frequency component of the signal induced by a touch.

In operation 540, the touch screen device calculates coordinates of the touch screen surface that is touched.

In operation 550, the touch screen device maps the external device identified in operation 530 to the calculated coordinates of the touch screen surface that is touched.

In addition, the touch screen device may calculate first coordinates of the touched point on the touch screen surface, and then, maps the external device to the first coordinates.

In addition, the touch screen device may execute user verification services that allow the external device to access the touch screen device or to access the object displayed on the first coordinates of the touch screen device using the user verification information stored in the external device.

Also, as described above, the external device may be another touch screen device in addition to the touch screen device. In this case, the touch screen device calculates first coordinates of the touched point on the touch screen surface, and then, performs a mapping operation of the calculated first coordinates to second coordinates that represent the touched point on the touch screen surface of the other touch screen device through the communication channel.

In addition, the touch screen device may transmit a control signal, which allows the object represented at the first coordinates to be represented at the second coordinates, to the other touch screen device or may receive the control signal from the other touch screen device.

Figure 6:
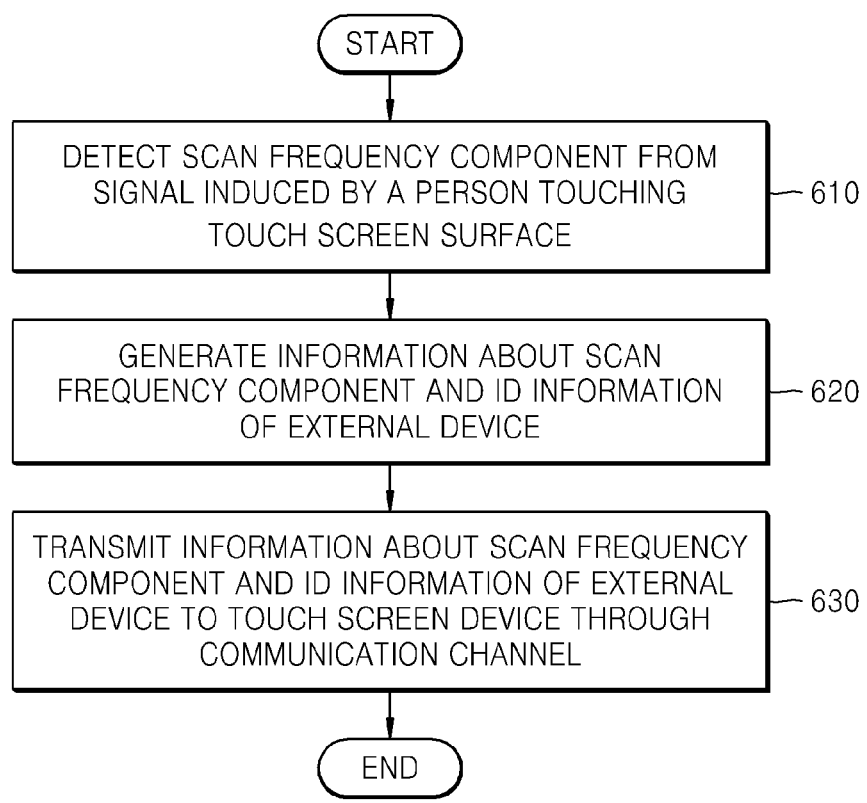
FIG. 6 is a flowchart illustrating a device information provision method for an external device according to another exemplary embodiment.

FIG. 6 is a flowchart illustrating a device information provision method for an external device according to another exemplary embodiment.

Referring to FIG. 6, in operation 610, the external device detects a scan frequency component from a micro-current signal including a scan frequency component induced by touching a touch screen surface. For example, the external device may perform band-pass filtering on the micro-current signal by using a scan frequency as a center frequency and perform tone-decoding on the band-pass filtered signal. The external device may be, for example, a cellular phone, a digital camera, a camcorder, a PDA, an MP3 player, or a PMP, etc.

In operation 620, the external device generates information about the scan frequency component and ID information of the external device that has received the micro-current signal.

In operation 630, the external device transmits the information about the scan frequency component and the ID information to the touch screen device through a communication channel. The communication channel may be a wired or wireless channel using a PnP protocol such as an UPnP protocol.

When the scan frequency of a micro-current induced by touching the touch screen surface is temporarily changed by the touch screen device, the external device may repetitively perform operations 610 through 630.

In addition, when the external device is identified by the touch screen device and is mapped on the first coordinates that represent the touched point on the touch screen surface in the touch screen device, the external device may access the touch screen device using the user verification information stored therein or may execute a user verification process for accessing the object displayed at the first coordinates of the touch screen device.

In addition, the external device may be another touch screen device in addition to the touch screen device. In this case, the external device calculates second coordinates that represent the touched point of the touch screen surface of the external device, and may perform a mapping operation of the second coordinates to the first coordinates of the touch screen device.

In addition, for example, the external device may transmit a control signal, which allows the object displayed at the first coordinates to be displayed at the second coordinates, to the touch screen device or may receive the control signal from the touch screen device.

Figure 11:
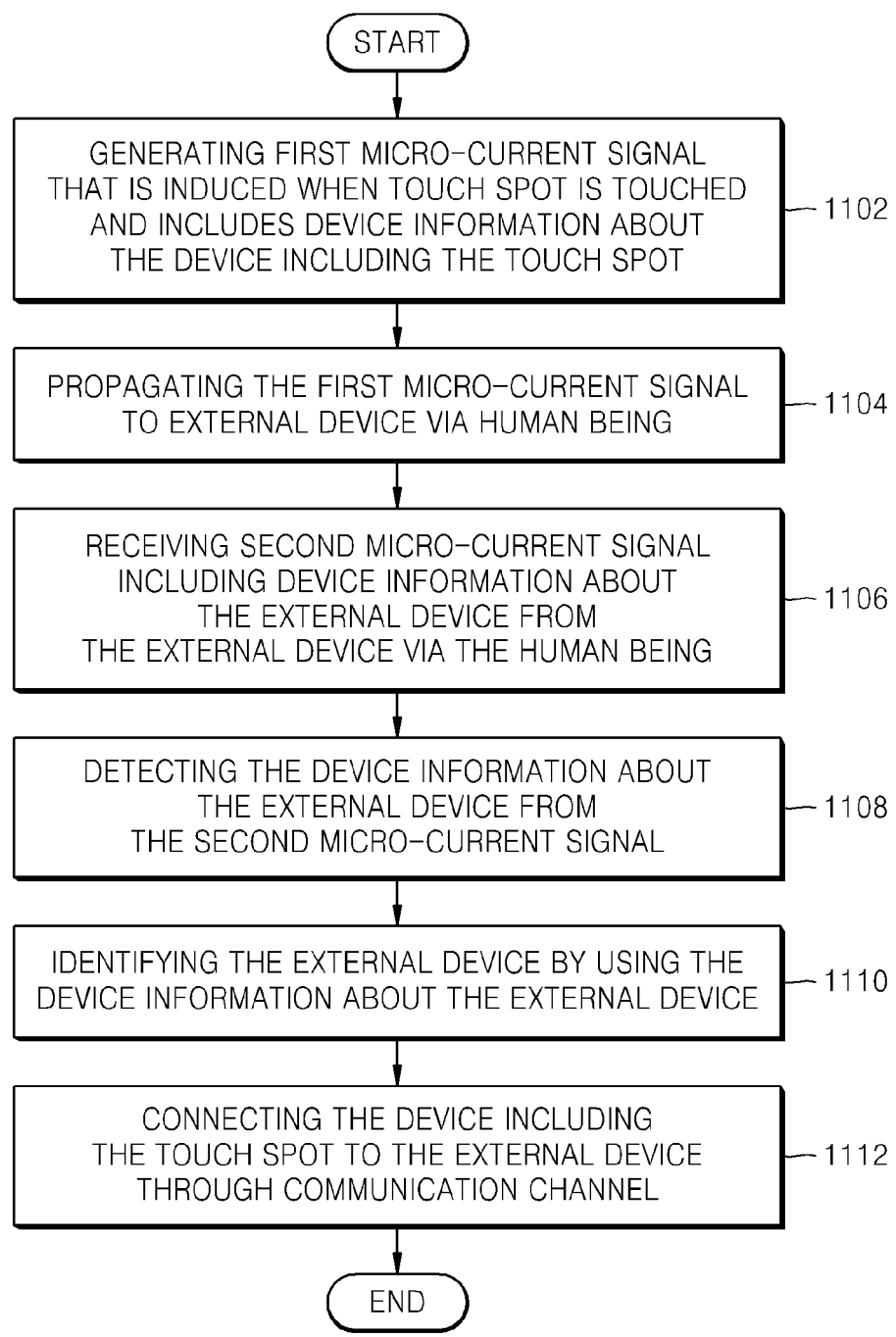
FIG. 11 is a flowchart illustrating an external device identification method in a device including a touch spot according to another exemplary embodiment.

FIG. 11 is a flowchart illustrating an external device identification method in a device including a touch spot according to another exemplary embodiment.

In operation S1102, the device including the touch spot generates a first micro-current signal that is induced when the touch spot is touched and includes device information about the device including the touch spot.

The touch spot may be a touch electrode or a capacitor button, for example. The touch electrode may be disposed to cover an upper portion of a physical operation button (see FIG. 9B). Alternatively, the touch electrode may be disposed on a rear surface of a display screen including the touch spot (see FIG. 9C).

The capacitive button propagates the first micro-current signal to the external device in a time-divisional manner and receives the second micro-current signal from the external device, and may be used to control the generation of the first micro-current signal and receipt of the second micro-current signal (see FIG. 9A).

In operation S1104, the device including the touch spot propagates the first micro-current signal to the external device via the human being. For example, the device including the touch spot may generate a binary signal including the device information about the device including the touch spot and may generate the first micro-current signal by modulating the binary signal, and may output the generated first micro-current signal to the touch spot.

In operation S1106, the device including the touch spot receives the second micro-current signal including device information about the external device via the human being from the external device. The second micro-current signal may be received through the same touch spot as or different touch spot from that of the first micro-current signal.

In operation S1108, the device including the touch spot detects the device information of the external device from the second micro-current signal. For example, the device including the touch spot removes a noise component from the second micro-current signal, amplifies the signal from which the noise component is removed, and demodulates the amplified signal to detect the signal including the device information about the external device.

In operation S1110, the device including the touch spot identifies the external device by using the detected device information about the external device.

In operation S1112, the device including the touch spot connects to the external device through the communication channel.

In addition, the device including the touch spot may control the device to generate the first micro-current signal and receive the second micro-current signal when the physical operation button or the operation button displayed on the graphic user interface is pushed.

A program for executing a touch-screen based device identification method and an external device identification method in a device including touch spot according to the exemplary embodiments can be embodied as a computer-readable code on a computer-readable recording medium. The computer-readable recording medium may be a computer readable storage medium such as any data storage device that can store data which can be thereafter read by a computer system. Examples of computer-readable storage media include read-only memory (ROM), random-access memory (RAM), CD-ROMs, magnetic tapes, floppy disks, and optical data storage devices. Alternatively, the computer readable recording medium may be a computer readable transmission medium such as a carrier wave. The computer-readable recording medium can be distributed over network of coupled computer systems so that the computer-readable code is stored and executed in a decentralized fashion.

While exemplary embodiments been particularly shown and described, it will be understood by those of ordinary skill in the art that various changes in form and details may be made therein without departing from the spirit and scope of the inventive concept as defined by the following claims.

What is claimed is:

1. An external device identification apparatus in a device including a touch spot, the apparatus comprising:
    a touch sensing unit configured to generate a micro-current signal including a scan frequency component that is induced when the touch spot is touched;
    a transmission unit configured to propagate the micro-current signal including the scan frequency component through a user body to an external device which is in contact with the user body;
    a reception unit configured to receive, at the device including the touch spot, information related to the micro-current signal including the scan frequency component which is detected by the external device and an identification (ID) of the external device through a communication channel other than through the user body; and
    an identification unit configured to identify, at the device including the touch spot, the external device based on the received information related to the detected signal and the received ID of the external device.

2. The apparatus of claim 1, wherein the device further includes a physical operation button or a graphic user interface that displays an operation button, the apparatus further comprising an operation control unit that, when the physical operation button or the operation button displayed on graphic user interface is touched by the user body, is configured to control a touch sensing unit to generate the micro-current signal including the scan frequency component.

3. The apparatus of claim 2, wherein the touch spot is a touch electrode or a capacitive button.

4. The apparatus of claim 3, wherein the touch electrode is disposed to cover an upper portion of the physical operation button.

5. The apparatus of claim 3, wherein the device further includes a display screen that displays the graphic user interface, and the touch electrode is disposed on a surface of device opposite to a surface of the display screen.

6. The apparatus of claim 2, wherein the touch electrode is a capacitive button, and the capacitive button is connected by a switch to the transmission unit and the operation control unit in a time-divisional manner.

7. The apparatus of claim 1, wherein the touch sensing unit comprises:
    a signal generation unit configured to generate a binary signal including the scan frequency component about the device including the touch spot; and
    a modulation unit configured to generate the micro-current signal by modulating the binary signal, and output the micro-current signal to the touch spot.

8. The apparatus of claim 1, wherein the device including the touch spot is a remote controller for controlling the external device remotely.

9. The apparatus of claim 1, wherein the touch sensing unit is configured to change a scan frequency of a micro current signal induced by touching a touch spot when the touch sensing unit and the external device have the same scan frequency.

10. An external device identification method in a device including a touch spot, the method comprising:
    generating a micro-current signal including a scan frequency component that is induced when the touch spot is touched;
    propagating the micro-current signal including the scan frequency component through a user body to an external device which is in contact with the user body;
    receiving, at the device including the touch spot, information related to the micro-current signal including about the scan frequency component which is detected by the external device through a communication channel other than through the user body; and
    identifying, at the device including the touch spot, the external device based on the received information related to the detected signal and the received ID of the external device.

11. The method of claim 10, wherein the device further includes a physical operation button or a graphic user interface, and
    the method further comprises controlling the device to generate the micro-current signal including the scan frequency component at a time at which the physical operation button or the operation button displayed on graphic user interface is touched by the user body.

12. The method of claim 11, wherein the touch spot is a touch electrode or a capacitive button.

13. The method of claim 11, wherein the touch electrode is disposed to cover an upper portion of the physical operation button.

14. The method of claim 11, wherein the device further includes a display screen, and the touch electrode is disposed on a surface of the device opposite to the surface of the display screen.

15. The method of claim 11, wherein the touch spot is a capacitive button, and the capacitive button is configured to propagate the micro-current signal to the external device and to control the generation of the micro-current signal in a time-divisional manner.

16. The method of claim 10, wherein generating the micro-current signal comprises:
generating a binary signal including the scan frequency component related to the device including the touch spot;
generating the micro-current signal by modulating the binary signal; and
outputting the micro-current signal to the touch spot.

17. The method of claim 10, wherein the device including the touch spot is a remote controller for controlling the external device remotely.

18. The method of claim 10, further comprising changing a scan frequency of a micro current signal induced by touching a touch spot when the touch sensing unit and the external device have the same scan frequency.

19. A non-transitory computer readable recording medium having embodied thereon a program for executing an external device identification method in a device including a touch spot, the method comprising:
generating a micro-current signal including a scan frequency component that is induced when the touch spot is touched;
propagating the micro-current signal including the scan frequency component through a user body to an external device which is in contact with the user body;
receiving, at the device including the touch spot, information related to the micro-current signal including the scan frequency component which is detected by the external device and an identification (ID) of the external device through a communication channel other than through the user body; and
identifying, at the device including the touch spot, the device based on the received information related to the detected signal and the received ID of the external device.

20. The non-transitory computer-readable recording medium having embodied thereon a program for executing an external device identification method in a device including a touch spot of claim 19, further comprising changing a scan frequency of a micro current signal induced by touching a touch spot when the touch sensing unit and the external device have the same scan frequency.

* * * * *